Patented Nov. 26, 1940

2,223,327

UNITED STATES PATENT OFFICE 2,223,327

METHOD OF COATING METALS

Donald W. Light, Old Greenwich, and Leonard Patrick Moore, Stamford, Conn., assignors to American Cyanamid Company, New York, N. Y., a corporation of Maine No Drawing. Application March 4, 1939, Serial No. 259,876

2 Claims. (Cl. 91—70)

This invention relates to a method of preventing metals from tarnishing and to improved lacquer compositions that are especially well suited for application to tarnishable metals. Objects of the invention are to provide a tarnish-resistant coating for metals such as silver, brass and the like which is extremely hard, heat resistant and wear resistant.

Heretofore it has been customary to coat tarnishable metals such as silver hollow-ware, brass hardware, locks and the like with a film of varnish or lacquer to prevent tarnish and corrosion during the various stages of manufacture and while on the dealers' shelves. Air-drying lacquers containing nitro-cellulose are usually employed for this purpose, and the silverware or tarnishable metal parts are dipped into or brushed or sprayed with the lacquer composition. The resulting article remains tarnish proof for a short period of time, usually long enough to permit it to be sold, but upon the use or ageing of the article the nitrocellulose base lacquer soon begins to crack and peel. When this happens the article is of course no longer tarnish proof, and it must be relacquered at frequent intervals.

We have succeeded in developing a tarnish resistant coating for tarnishable metals such as silverware, brass hardware, including locks, doorknobs, hinges, railings and the like, which is exceptionally hard and which is resistant to heat, moisture and discoloration by light. Tarnishable metal articles coated in accordance with our invention are protected by a clear and practically invisible film that does not alter their appearance. This film has a long effective life and will protect the surface of the metal both from tarnish and scratching.

We have found that lacquer coatings containing alkylated aminotriazine-aldehyde condensation products will prevent the tarnishing of tarnishable metals for long periods of time. Lacquers of this class, when properly prepared, will form perfectly clear, colorless and haze-free films and when baked on the metal will protect its surface for long periods of time. Our invention in its broader aspects therefore contemplates the application to any tarnishable metal of a surface finish comprising an adherent, baked coating containing an alkylated aminotriazine-aldehyde condensation product.

The alkylated aminotriazine-aldehyde lacquers may be prepared by condensing an aminotriazine and an aldehyde under acid, neutral or alkaline conditions and in the presence or absence of a solvent for the incompletely polymerized reaction products which are first formed. These condensation products may be prepared by any suitable process and in any desired combining ratio of aldehyde to aminotriazine from 1:1 up to and including 6:1, but we have found that for the purposes of the present invention products containing from 3 to 6 moles of aldehyde for each mole of aminotriazine are preferable. The incompletely polymerized reaction products may be alkylated by any desired method, such as by heating with an acidified solution of any suitable alcohol such as methanol, propanol, butanol, cyclohexanol, amyl alcohol or the mixture of isomeric amyl alcohols known commercially as "Pentasol." Polyhydric alcohols such as glycerine or ethylene glycol may also be used if desired. In the preparation of the lacquers a two-stage process may be used in which the aminotriazine and aldehyde are condensed at a pH of 7 or higher and the resulting condensation product is dispersed in the alcohol at a pH of less than 6, or a one-stage process may be used in which both the initial condensation of the aminotriazine and the aldehyde and the subsequent dispersion in alcohol are carried out at a pH of less than 6.

The broad principles of our invention are not limited to any single aminotriazine-aldehyde condensation product, and any resinophoric material of this class may be used if desired. However, the condensation products of melamine and its derivatives such as 2.4.6 triethyl and triphenyl triamino 1.3.5 triazines, 2.4.6 trihydrazino 1.3.5 triazine and the corresponding condensed triazines such melam and melem appear at the present time to be of greatest immediate commercial importance, by reason of the availability of melamine and its derivatives from dicyandiamide or cyanuric chloride as raw materials, and for this reason tarnishable metals coated with lacquers containing these classes of materials constitute preferred embodiments of the invention. On the other hand, triazines containing one or two reactive amino groups such as ammeline, ammelide, formoguanamine, 2 amino 1.3.5 triazine and their substitution products as well as nuclear substituted aminotriazines such as 2 chloro 4.6 diamino 1.3.5 triazine, 2 phenyl 4 amino 6 hydroxy 1.3.5 triazine, 6 methyl 2.4 diamino 1.3.5 triazine and the like can be condensed with lower or higher aliphatic, aromatic or heterocyclic aldehydes to produce products which when alkylated will form lacquers capable of accomplishing objects of the invention and such condensation products are therefore included in the invention in its broader aspects.

Any of the foregoing aminotriazines, including melamine, substituted melamines and melamine derivatives, can be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde benzaldehyde, cinnamylaldehyde, furfural and the like to produce condensation products which can be alkylated and applied to tarnishable metals as a tarnish resistant coating.

The invention will be illustrated in greater detail by the following specific examples. It should be understood, however, that although these examples describe certain of the more specific features of the invention they are given primarily for illustrative purposes, and that the invention in its broader aspects is not limited thereto.

*Example 1*

A lacquer is prepared by refluxing 126 parts of melamine in 324 parts (1:4 ratio) of 37% formalin for ½ hour at a pH of 7.2-9.0. 700 parts of butanol acidified with 1 part of 85% phosphoric acid are then added and after 1 hour additional refluxing the water is removed by distillation, more butanol being added if necessary, until the solution is anhydrous. The lacquer is finally filtered. An alkyd resin compatible with this lacquer and suitable as a plasticizing agent may be made by heating 147 parts of phthalic anhydride with 90 parts glycerin and 190 parts castor oil until suitable viscosity is reached. This resin is filtered.

40 parts of the melamine lacquer are then mixed with 60 parts of the alkyd resin and cut with butanol to a viscosity suitable for spraying. The silver, brass, bronze or other metal objects to be coated, and that have been thoroughly cleaned, are then sprayed so that a thin, continuous film of the lacquer is formed. The metallic objects are then placed in a drying oven maintained at 150° C. for 15 minutes, by which time the film is thoroughly cured.

A silver ash tray was coated with this lacquer and baked, and lighted cigarettes were placed upon it with their lighted tips in contact with the surface. The lacquer coating did not burn or soften, and the metal beneath it remained untarnished.

*Example 2*

150 parts of hexamethylol melamine, 300 parts of anhydrous butanol and 0.75 part of 85% phosphoric acid are stirred together for 30-60 minutes. Heat is then applied and a mixture of butanol and water is distilled off. The butanol is preferably replaced by continuous or intermittent additions of anhydrous butanol and the distillation is continued until all the water is removed.

The resulting lacquer may be thinned to spraying consistency with butanol and applied to silverware by spraying or dipping. When baked at 200° C. for 5-10 minutes it forms a hard, clear film having remarkable heat resistance.

*Example 3*

110 parts of 2.4 diamino 1.3.5 triazine are heated with 243 parts of 37% formaldehyde solution for about 4 hours. 400 parts of butanol containing 1 part of 85% phosphoric acid are added and the mixture is boiled until all its water content has been removed, preferably with replacement of the butanol distilled off.

The resulting lacquer may be mixed with an alkyd plasticizer as in Example 1 and used for coating the parts of brass locks during manufacture, or for coating brass doorknobs, lighting fixtures, or andirons and fender sets for fireplaces. The coating may be by spraying, dipping or brushing, and the resulting coated pieces should be baked for 10-20 minutes at 150-175° C.

What we claim is:

1. A method of preventing the tarnishing of silver and brass which comprises coating a metal selected from the group consisting of silver and brass with a lacquer containing a castor oil-modified phthalic glyceride resin and a butylated melamine-formaldehyde resin prepared by reacting from about 3 moles of formaldehyde to about 6 moles of formaldehyde with 1 mole of melamine and with butanol under acid conditions and subjecting the coated metal to a temperature of about 150° C. until a hard, clear coating is obtained.

2. A tarnishable metal selected from the group consisting of silver and brass having a surface coating comprising a baked film containing a castor oil-modified phthalic glyceride resin and a butylated melamine-formaldehyde resin prepared by reacting from about 3 moles of formaldehyde to about 6 moles of formaldehyde with 1 mole of melamine and with butanol under acid conditions.

DONALD W. LIGHT.
LEONARD P. MOORE.